3,222,411
Patented Dec. 7, 1965

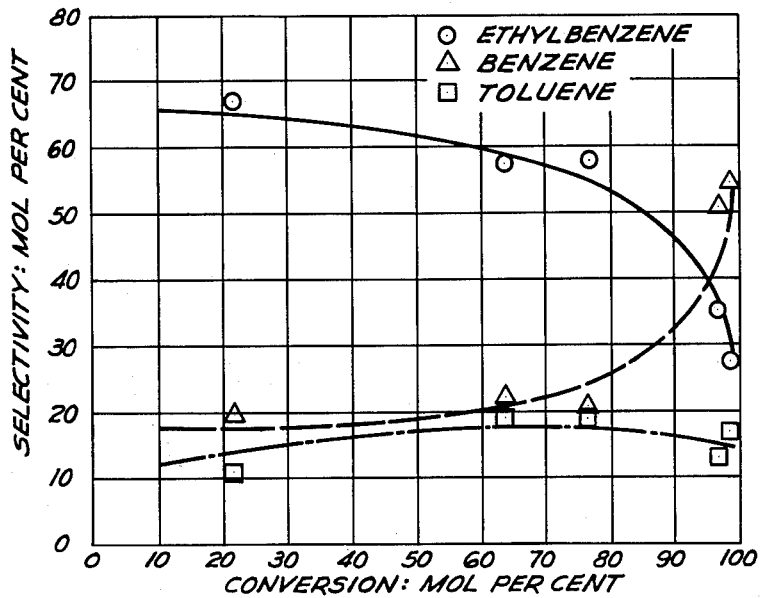
DEALKYLATION OF n-PROPYLBENZENE
Fig. I
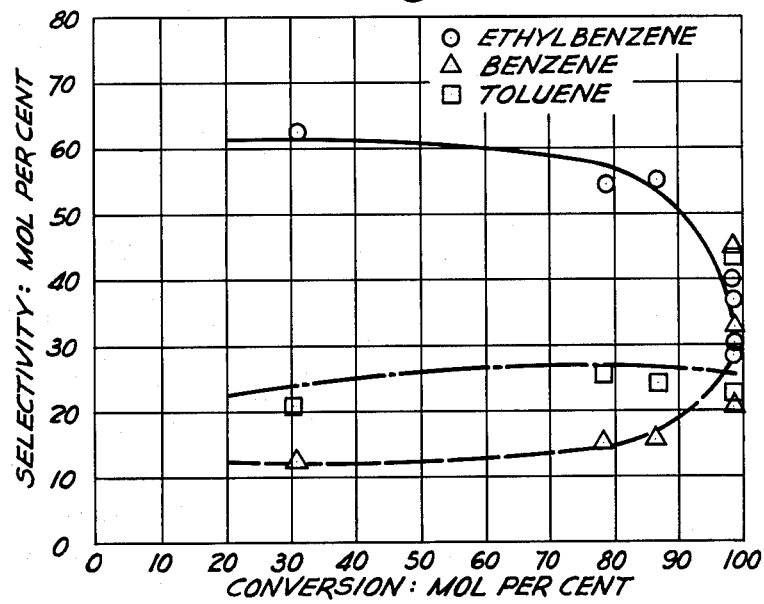
DEALKYLATION OF n-BUTYLBENZENE
Fig. II
INVENTORS.
HAROLD BEUTHER
JONAS DEDINAS
ALFRED M. HENKE
BY
ATTORNEY.

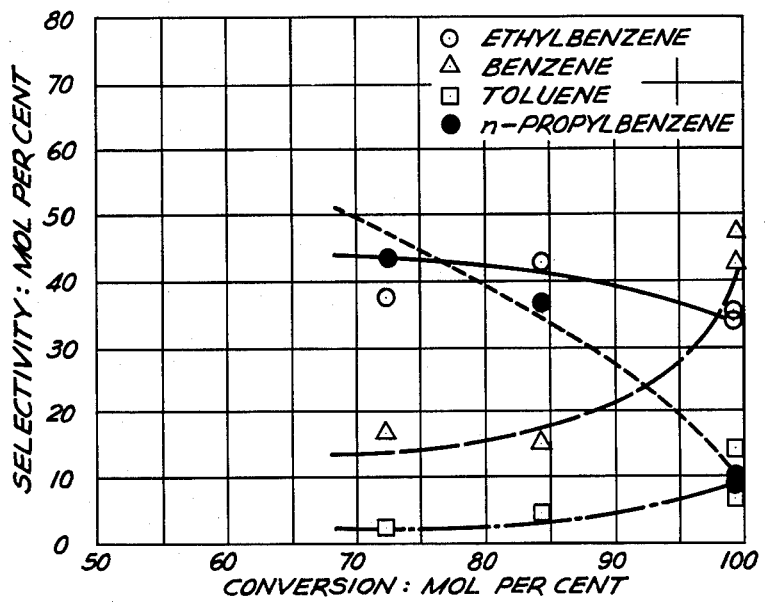
DEALKYLATION OF SECONDARY BUTYLBENZENE
Fig. III
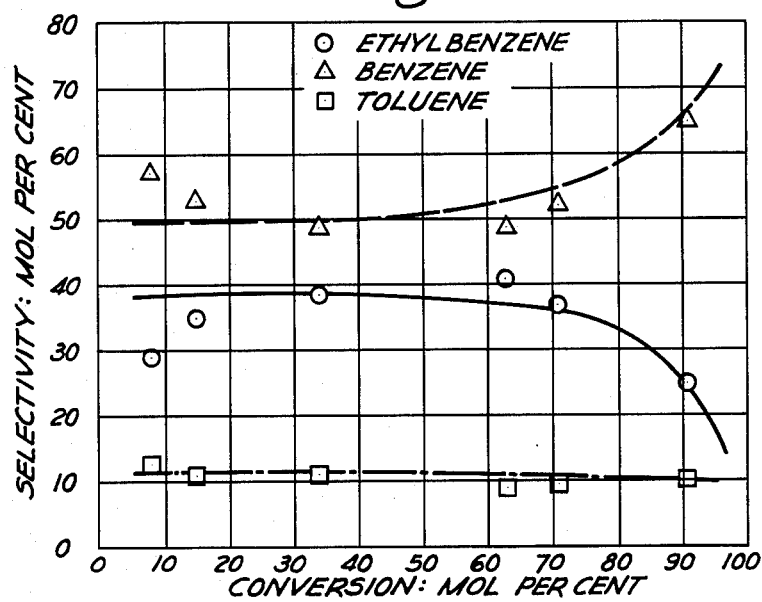
DEALKYLATION OF ISOPROPYLBENZENE
Fig. IV

United States Patent Office

3,222,411
PREPARATION OF ETHYLBENZENE BY DEALKYLATION OF HIGHER ALKYL BENZENES
Harold Beuther, Gibsonia, Jonas Dedinas, Pittsburgh, and Alfred M. Henke, Springdale, Pa., assignors to Gulf Research & Development Company, Pittsburgh, Pa., a corporation of Delaware
Filed Dec. 19, 1962, Ser. No. 245,891
11 Claims. (Cl. 260—672)

This invention relates to a process for preparing ethylbenzene, particularly to a process for the partial hydrodealkylation of an aromatic hydrocarbon to ethylbenzene. Ethylbenzene has many applications and can be dehydrogenated, for example, to obtain styrene.

We have found that we can obtain good selectivity of certain well-defined aromatic charge stocks to ethylbenzene by converting no more than a selected portion thereof during the hereindefined hydrodealkylation reaction.

The selection of the aromatic charge stock which is to be employed in the process of this invention is critical and must be an alkyl aromatic hydrocarbon selected from the group consisting of primary alkylbenzenes and secondary alkylbenzenes in which the alkyl groups have from three to 20 carbon atoms, preferably from three to eight carbon atoms. Examples of alkylbenzenes which can be employed as charge are normal butylbenzene, secondary butylbenzene, isopropylbenzene, secondary hexylbenzene, normal nonylbenzene, etc.

Since the process defined and claimed herein is a partial hydrodealkylation reaction, hydrogen must of course be employed in the reaction. The amount of hydrogen required is critical. Under the reaction conditions employed the majority of the alkyl substituents on the charge aromatic are cleaved at some stage between the second and third carbon atoms. At least about one mol of hydrogen is required to react with the aromatic residue and the cleaved alkyl portion to obtain ethylbenzene and saturated hydrocarbon, respectively. In the event the alkyl substituent on the charge aromatic has more than three carbon atoms, at least about one additional mol of hydrogen should be present per carbon atom present in the cleaved portion of the alkyl substituent in excess of three. This is so because we believe that under the reaction conditions employed some of the cleaved portion of the alkyl group is decomposed to individual fragments having as a nucleus an individual carbon atom. In such case, of course, a mol of hydrogen is required to saturate each carbon nucleus obtained and convert the same to methane. Additionally at least about one mol of hydrogen is required to inhibit the further decomposition of the ethylbenzene or other aromatics obtained in the process. In each instance described above, large amounts of hydrogen can be employed and the desired results will still be obtained. In order to assure optimum performances, however, about two to about five mols of hydrogen are employed in each instance where at least about one mol is theoretically required.

The initial step in the present invention involves heating the charge to reaction temperature. Although the aromatic charge and hydrogen can be heated separately, it is preferred that they be heated together to reaction temperature. The aromatic charge and hydrogen are thus heated to a temperature of about 900° F.

The partial hydrodealkylation reaction of this invention is carried out in the absence of a catalyst. If desired, however, an inert material such as quartz chips, sand, steamed silica gel, ceramic pebbles, etc., can be employed as an aid in temperature control. Any type of reactor, but preferably a tubular reactor, heated in any desired manner, can be employed. The walls of the reactor should be free of material which will catalyze the thermal dealkylation procedure defined herein, and the interior of the reactor should similarly be free of catalytic material. Insofar as the temperature of the reaction is concerned, it is important that it be maintained in the range of about 900° to about 1600° F., preferably about 950° F. to about 1300° F., most preferably at about 1125° F. Outside the defined temperature ranges the yield of ethylbenzene drops off markedly. Pressure is not critical, and therefore a pressure of about 250 pounds per square inch gauge or higher, preferably about 500 to about 1000 pounds per square inch gauge, can be employed. Contact time can be about two to about 500 seconds. A space velocity of at least about 0.5, preferably about one to about six (total volume of aromatic charge per free reactor volume per hour) can be employed.

As noted the temperature of the reaction is important and every effort must be made during the course of the reaction to maintain the same within the defined temperature range. This can be done in any desired manner. Thus, the reactor can be so designed and the flow of the reactants and/or amount of reactants flowing therethrough can be so regulated that the temperature is not permitted to rise outside the defined temperature limits. Alternatively, cold charge aromatic, hydrogen and/or inert gases can be introduced into the reactor to help control the temperature, provided the desired ratio of reactant aromatic to hydrogen is not adversely disturbed.

We have found that in order to obtain maximum selectivity of the alkylbenzene charge defined above to ethylbenzene the reaction defined herein must be terminated when no more than about 70 to about 90 mol percent, preferably no more than about 75 to about 85 mol percent, of said alkylbenzene has been converted. Amounts of said alkylbenzene below the defined amount can be converted and good selectivity to ethylbenzene will be obtained when said alkylbenzene is heated at the selected temperatures defined herein in the presence of hydrogen, but for economical purposes, and in the case of some charge stocks such as isopropylbenzene, we prefer to convert on a minimum basis about 25 to about 35 mol percent of the alkylbenzene charge.

The reaction product obtained at the end of the reaction period will contain predominantly ethylbenzene, toluene, benzene, methane, unreacted alkylbenzene and hydrogen. At the end of the reaction period when the desired conversion has been obtained, the reaction mixture is quenched to a temperature below which no appreciable reaction occurs, for example, at about 80° to about 800° F., in any suitable manner, such as by passing the same through a water-cooled condenser or preferably a heat exchanger. The lighter products produced in the reaction and hydrogen can be vented to the atmosphere, or, if desired, the hydrogen, with or without purification, can be recycled. The remaining product, including ethylbenzene, can be separated into its individual components or selected combinations thereof by any suitable means, for example, by fractional distillation at temperatures within a range of about 80° to about 450° F. at atmospheric pressure. If desired the unreacted alkylbenzene after recovery thereof can be recycled to the reactor.

The hydrogen employed in the thermal hydrodealkylation process defined herein need not be pure but may be present in a gaseous stream also containing materials which will not adversely affect the desired reaction. Coke oven gas, for example, can be advantageously employed for purposes of supplying hydrogen for the reaction. The composition of coke oven gas, in mol percent, is as follows: 52.1 percent hydrogen, 26.2 percent methane, 5.3 percent ethane, 5.8 percent carbon monoxide, 2.8 percent carbon dioxide, 0.5 percent hydrogen sulfide and 5.9 percent nitrogen. Since the hydrogen in such stream is consumed in the process and a saturated aliphatic hydrocarbon, such as methane, is formed, the resultant gas will contain more saturated aliphatic hydrocarbon and less hydrogen than the charge gas. Since on a volume basis the saturated aliphatic hydrocarbon has a higher caloric value than the hydrogen, the resultant gas will have an enhanced caloric value. For such reason in some cases an impure hydrogen stream is desirable as a source of hydrogen.

The process of this invention can be further illustrated by reference to the following. Thermal hydrodealkylation runs were made, using as charge therefor normal propylbenzene, normal butylbenzene, secondary butylbenzene and isopropylbenzene, in a reactor having a length of four inches and an inner diameter of one inch filled with a non-catalytic material, quartz chips, to effect better mixing and to reduce temperature gradients. Each of the charge stocks was mixed with hydrogen before preheating. The average reactor temperature was determined from several temperature measurements made inside the reactor with a movable chromel-alumel thermocouple. Pressures and temperature were maintained at set values by means of automatic control instruments. The unit was run off-stream to allow for stabilization of process conditions. Subsequently, a one-hour on-stream period was made during which product was collected and process conditions were maintainted constant. The results obtained are tabulated below in Tables I, II, III and IV.

TABLE I

Data Using n-Propylbenzene Charge

| Run No. | 1 | 2 | 3 | 4 | 5 |
|---|---|---|---|---|---|
| Temperature: °F | 951 | 1,040 | 1,152 | 1,049 | 1,150 |
| Space Velocity: LHSV | 1.0 | 1.2 | 1.1 | 2.0 | 2.0 |
| Pressure: P.s.i.g. | 993 | 1,000 | 1,020 | 996 | 998 |
| Hydrogen/Hydrocarbon: Mol./mol. | 4.0 | 3.4 | 3.8 | 4.1 | 4.0 |
| Conversion: Mol Percent | 22.2 | 77.5 | 98.6 | 64.0 | 97.2 |
| Selectivity to Benzene: Mol Percent | 19.9 | 20.7 | 54.7 | 22.2 | 50.7 |
| Selectivity to Toluene: Mol Percent | 11.0 | 19.6 | 17.1 | 19.3 | 13.3 |
| Selectivity to Ethylbenzene: Mol Percent | 67.3 | 59.0 | 27.6 | 57.8 | 35.6 |

TABLE II

Data Using n-Butylbenzene Charge

| Run No. | 6 | 7 | 8 | 9 | 10 | 11 | 12 |
|---|---|---|---|---|---|---|---|
| Temperature: °F | 1,149 | 1,145 | 947 | 1,049 | 1,152 | 1,052 | 1,152 |
| Space Velocity: LHSV | 1.0 | 2.1 | 1.1 | 1.0 | 1.0 | 2.0 | 2.0 |
| Pressure: P.s.i.g. | 1,003 | 1,001 | 1,000 | 1,003 | 1,001 | 998 | 1,000 |
| Hydrogen/Hydrocarbon: Mol./Mol. | 3.87 | 3.85 | 3.73 | 3.97 | 3.96 | 4.07 | 4.06 |
| Conversion: Mol. Percent | 98.9 | 98.4 | 31.5 | 87.3 | 98.6 | 79.3 | 99.2 |
| Selectivity to Benzene: Mol Percent | 44.7 | 32.5 | 12.1 | 15.7 | 20.2 | 15.5 | 38.9 |
| Selectivity to Toluene: Mol Percent | 23.9 | 24.0 | 20.7 | 24.3 | 45.0 | 25.4 | 22.8 |
| Selectivity to Ethylbenzene: Mol Percent | 28.2 | 40.0 | 62.5 | 55.1 | 30.4 | 54.3 | 37.0 |

TABLE III

Data Using Sec-Butylbenzene Charge

| Run No. | 13 | 14 | 15 | 16 |
|---|---|---|---|---|
| Temperature: °F | 1,152 | 1,050 | 1,148 | 1,055 |
| Space Velocity: LHSV | 1.1 | 2.0 | 2.0 | 1.4 |
| Pressure: P.s.i.g. | 1,000 | 1,003 | 997 | 1,006 |
| Hydrogen/Hydrocarbon: Mol./Mol. | 3.7 | 3.9 | 4.1 | 2.8 |
| Conversion: Mol Percent | 99.1 | 72.5 | 99.3 | 84.5 |
| Selectivity to Benzene: Mol. Percent | 42.9 | 16.8 | 47.8 | 15.4 |
| Selectivity to Toluene: Mol. Percent | 14.4 | 2.3 | 7.0 | 4.5 |
| Selectivity to Ethylbenzene: Mol Percent | 35.8 | 37.9 | 35.5 | 43.2 |
| Selectivity to n-Propylbenzene: Mol Percent | 10.0 | 43.5 | 9.0 | 36.8 |

TABLE IV

Data Using Isopropylbenzene Charge

| Run No. | 17 | 18 | 19 | 20 | 21 | 22 |
|---|---|---|---|---|---|---|
| Temperature: °F | 1,051 | 1,151 | 1,054 | 1,152 | 1,046 | 1,155 |
| Space Velocity: LHSV | 1.2 | 3.0 | 3.0 | 4.9 | 4.9 | 1.1 |
| Pressure: P.s.i.g. | 995 | 1,003 | 1,003 | 1,006 | 1,003 | 993 |
| Hydrogen/Hydrocarbon Mol./Mol. | 3.42 | 4.06 | 4.00 | 4.90 | 4.05 | 3.72 |
| Conversion: Mol Percent | 34.2 | 70.6 | 14.7 | 62.7 | 7.8 | 90.4 |
| Selectivity to Benzene: Mol Percent | 49.2 | 52.7 | 53.5 | 49.5 | 56.9 | 64.6 |
| Selectivity to Toluene: Mol Percent | 11.0 | 9.9 | 11.0 | 9.1 | 12.9 | 10.2 |
| Selectivity to Ethylbenzene: Mol Percent | 38.5 | 36.7 | 34.6 | 40.9 | 29.2 | 24.7 |

The data from Tables I, II, III and IV are graphically represented in FIGURES I, II, III and IV, respectively. Note that in each case when more than about 70 to about 90 mol percent of the charge aromatic was converted, selectivity to ethylbenzene progressively decreased and substantially all of alkylbenzene was converted to benzene. Although the secondary butylbenzene runs are limited to relatively high conversions, the data indicate, and our experience on other similar runs, lead us to the conclusion that at lower conversions selectivity to ethylbenzene will remain high. In the case of isopropylbenzene, selectivity to ethylbenzene remained relatively high at conversion levels below about 75 mol percent but dropped off sharply when the conversion level was greatly in excess thereof.

That it is imperative that the charge aromatic must be one which comes within the definition thereof as set forth hereinabove is apparent from the fact that we have carried out the identical reaction described in the above runs but using instead tertiary butylbenzene. At a temperature of 1050° F., a pressure of 1000 pounds per square inch gauge and a space velocity of two, when 78.5 mol percent of the tertiary butylbenzene charge was converted selectivity to ethylbenzene was 7.9 mol percent. At 1048° F., a pressure of 1000 pounds per square inch gauge and a space velocity of 1.1, when 81.5 mol percent of the tertiary butylbenzene was converted selectivity to ethylbenzene was only 8.5 mol percent.

Obviously many modifications and variations of the invention, as hereinabove set forth, can be made without departing from the spirit and scope thereof and only such limitations should be imposed as are indicated in the appended claims.

We claim:

1. A process for converting an alkylbenzene selected from the group consisting of primary and secondary alkylbenzenes in which said alkyl substituent has from three to 20 carbon atoms to ethylbenzene which comprises reacting said alkylbenzene with hydrogen at a temperature of 900° F. to about 1600° F., terminating said reaction when no more than about 70 to about 90 mol percent of said alkylbenzene has been converted and thereafter recovering ethylbenzene from the reaction product, said conversion having been effected solely as a result of said alkylbenzene having been subjected to said temperature.

2. A process for converting a primary alkylbenzene in which said alkyl substituent has from three to 20 carbon atoms to ethylbenzene which comprises reacting said alkylbenzene with hydrogen at a temperature of about 900° to about 1600° F., terminating said reaction when no more than about 70 to about 90 mol percent of said alkylbenzene has been converted and thereafter recovering ethylbenzene from the reaction product, said conversion having been effected solely as a result of said alkylbenzene having been subjected to said temperature.

3. A process for converting a secondary alkylbenzene in which said alkyl substituent has from three to 20 carbon atoms to ethylbenzene which comprises reacting said alkylbenzene with hydrogen at a temperature of about 900° to about 1600° F., terminating said reaction when no more than about 70 to about 90 mol percent of said alkylbenzene has been converted and thereafter recovering ethylbenzene from the reaction product, said conversion having been effected solely as a result of said alkylbenzene having been subjected to said temperature.

4. A process for converting normal propylbenzene to ethylbenzene which comprises racting said alkylbenzene with hydrogen at a temperature of about 950° to about 1300° F., terminating said reaction when no more than about 70 to about 90 mol percent of said alkylbenzene has been converted and thereafter recovering ethylbenzene from the reaction product, said conversion having been effected solely as a result of said alkylbenzene having been subjected to said temperature.

5. A process for converting normal butylbenzene to ethylbenzene which comprises reacting said alkylbenzene with hydrogen at a temperature of about 950° to about 1300° F., terminating said reaction when no more than about 70 to about 90 mol percent of said alkylbenzene has been converted and thereafter recovering ethylbenzene from the reaction product, said conversion having been effected solely as a result of said alkylbenzene having been subjected to said temperature.

6. A process for converting secondary butylbenzene to ethylbenzene which comprises reacting said alkylbenzene with hydrogen at a temperature of about 950° to about 1300° F., terminating said reaction when no more than about 70 to about 90 mol percent of said alkylbenzene has been converted and thereafter recovering ethylbenzene from the reaction product, said conversion having been effected solely as a result of said alkylbenzene having been subjected to said temperature.

7. A process for converting isopropylbenzene to ethylbenzene which comprises reacting said alkylbenzene with hydrogen at a temperature of about 950° to about 1300° F., terminating said reaction when no more than about 70 to about 90 mol percent of said alkylbenzene has been converted and thereafter recovering ethylbenzene from the reaction product, said conversion having been effected solely as a result of said alkylbenzene having been subjected to said temperature.

8. A process for converting normal propylbenzene to ethylbenzene which comprises reacting said alkylbenzene with hydrogen at a temperature of about 950° to about 1300° F., terminating said reaction when about 70 to about 90 mol percent of said alkylbenzene has been converted and thereafter recovering ethylbenzene from the reaction product, said conversion having been effected solely as a result of said alkylbenzene having been subjected to said temperature.

9. A process for converting normal butylbenzene to ethylbenzene which comprises reacting said alkylbenzene with hydrogen at a temperature of about 950° to about 1300° F., terminating said reaction when about 70 to about 90 mol percent of said alkylbenzene has been converted and thereafter recovering ethylbenzene from the reaction product, said conversion having been effected solely as a result of said alkylbenzene having been subjected to said temperature.

10. A process for converting secondary butylbenzene to ethylbenzene which comprises reacting said alkylbenzene with hydrogen at a temperature of about 950° to about 1300° F., terminating said reaction when about 70 to about 90 mol percent of said alkylbenzene has been converted and thereafter recovering ethylbenzene from the reaction product, said conversion having been effected solely as a result of said alkylbenzene having been subjected to said temperature.

11. A process for converting isopropylbenzene to ethylbenzene which comprises reacting said alkylbenzene with hydrogen at a temperature of about 950° F. to about 1300° F., terminating said reaction when about 70 to about 90 mol percent of said alkylbenzene has been converted and thereafter recovering ethylbenzene from the reaction product, said conversion having been effected solely as a result of said alkylbenzene having been subjected to said temperature.

References Cited by the Examiner

UNITED STATES PATENTS

| | | | |
|---|---|---|---|
| 2,222,632 | 11/1940 | Sachanen et al. | 260—672 |
| 2,907,800 | 10/1959 | Mertes | 260—672 |
| 2,913,397 | 11/1959 | Murray et al. | 260—672 |

OTHER REFERENCES

Sachanen: "Conversion of Petroleum" (Second Edition), Reinhold Publishing Corp., New York (1948); pages 73, 74 and 87–90 relied upon.

ALPHONSO D. SULLIVAN, *Primary Examiner.*